United States Patent [19]

Umezawa et al.

[11] Patent Number: 4,572,264
[45] Date of Patent: Feb. 25, 1986

[54] PNEUMATIC RADIAL TIRES

[75] Inventors: Yujiro Umezawa, Tokyo; Shigehisa Sano, Akigawa; Takao Ogino, Tokorozawa, all of Japan

[73] Assignee: Bridgestone Tire Co., Ltd., Tokyo, Japan

[21] Appl. No.: 561,508

[22] Filed: Dec. 15, 1983

[30] Foreign Application Priority Data

Dec. 29, 1982 [JP] Japan ............................. 57-230061

[51] Int. Cl.⁴ .............................................. B60C 9/00
[52] U.S. Cl. .................................. 152/451; 156/124; 57/213; 57/218; 57/902
[58] Field of Search ................... 152/359, 356, 330 R, 152/362 R; 156/124; 57/212, 213, 218, 902

[56] References Cited

U.S. PATENT DOCUMENTS

| | | | |
|---|---|---|---|
| 3,358,435 | 12/1967 | Peene | 57/218 |
| 3,778,993 | 12/1973 | Glushko et al. | 57/212 |
| 3,996,733 | 12/1976 | Holmes | 57/902 |
| 4,311,001 | 1/1982 | Glushko et al. | 57/212 |

FOREIGN PATENT DOCUMENTS

| | | | |
|---|---|---|---|
| 50-20104 | 6/1975 | Japan . | |
| 163905 | 12/1981 | Japan | 152/359 |

*Primary Examiner*—Lois E. Boland
*Attorney, Agent, or Firm*—Sughrue, Mion, Zinn, Macpeak & Seas

[57] ABSTRACT

A pneumatic radial tire is disclosed, which comprises steel cords having a two or three layer construction represented by a designation of 1+m or 1+m+n as a tire reinforcement, wherein two layers at a center side of a transverse section in the steel cord have the same twisting direction but different twisting pitches. In this steel cord, m filaments constituting an outer layer are arranged so as to enter into an inside of a circumscribed circle enveloping l filaments of an inner layer at a non-contact region above a predetermined value and have a form ratio of 90–110%.

3 Claims, 4 Drawing Figures

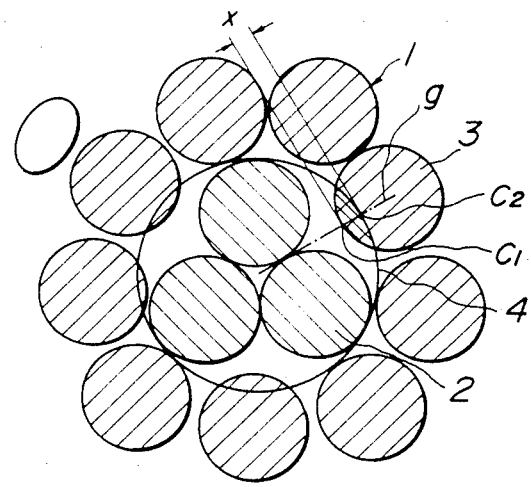
FIG_3
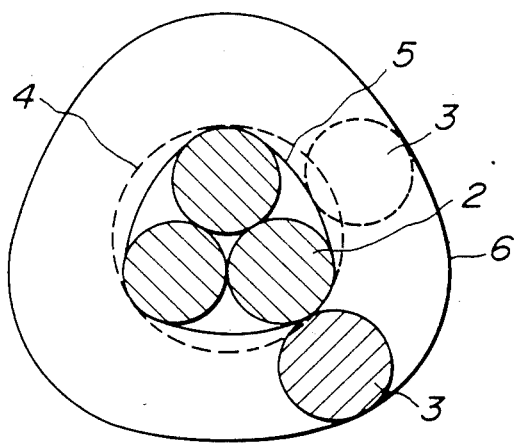
FIG_4

PNEUMATIC RADIAL TIRES

This invention relates to pneumatic radial tires, and more particularly to a pneumatic radial tire having a prolonged tire life by changing the arrangement and the like of steel filaments in inner two layers in steel cords with a two or three layer construction to improve the durability of the steel cord.

The twisting construction of tire steel cord is now changing from a so-called strand construction represented by p×q (p and q are an integer of not less than 2, respectively) to a layer construction. This has occurred because, the layer construction has the following merits as compared with the strand construction:

(1) The fretting due to mutual contacts between filaments is little and the reduction of strength is small; and
(2) The productivity per unit time is high.

However, when the twisting directions of the inner and outer layers are opposite to each other (SZ or ZS) even in the case of the layer construction, the same fretting phenomenon as in the strand construction is caused and the improving effect is not observed, or even if the improving effect is observed, the preliminary breaking of particular filaments in the specific layer is still observed and the effect is insufficient.

Therefore, it has been attempted to apply steel cords with the layer construction having the same twisting direction between the inner and outer layers to pneumatic radial tires as disclosed, for example, in Japanese Utility Model Application Publication No. 50-20,104. In this case, however, it is desired to achieve an ideal helical form or it is neglected to provide an effect by entering the filaments of the outer layer into spaces of the inner layer as mentioned later, so that there is caused no entering phenomenon or the entering degree is very small. Consequently, the balance in tension between the inner and outer layers is poor during the tension deformation and stress is unavoidable to concentrate in the inner layer.

It is, therefore, an object of the invention to mitigate stress concentration at an inner layer in steel cords with a layer construction during tension deformation by entering filaments of the outer layer of the steel cord into spaces of the inner layer thereof at a ratio above the given value. It is another object of the invention to reduce the interaction of filaments between the layers of the steel cord to prevent the breaking of the cord and improve the durability thereof. It is a further object of the invention to prevent cord breaking-up failure of the steel cord used in belt layer and carcass ply for pneumatic radial tires to prolong the tire life.

According to the invention, there is the provision of a pneumatic radial tire comprising as a tire reinforcement steel cords each having a two or three layer construction represented by a designation of $l+m$ or $l+m+n$, wherein l, m and n are an integer, respectively and satisfy a relation of $l<m<n$ and l is an integer of 2 to 5, in which two layers at a center side of a transverse section in said steel cord represented by the designation of $l+m$ have the same twisting direction but different twisting pitches, the improvement wherein m filaments constituting an outer layer among said two layers are arranged so as to enter into an inside of a circumscribed circle enveloping l filaments constituting an inner layer among said two layers at such a portion that the filaments of said outer layer do not come into contact with the filaments of said inner layer, and an average value $\bar{x}_O$ of a maximum value of an amount of entering a filament into the inside of the circumscribed circle per m filaments in the steel cord of a tire product satisfies the following equations:

$$(-0.24k^2+0.46k)d<\bar{x}_O<(-0.73k^2+1.37k)d, \text{ when } l \text{ is } 2 \quad (1)$$

$$(-0.10k^2+0.24k)d<\bar{x}_O<(-0.31k^2+0.73k)d, \text{ when } l \text{ is } 3 \quad (2)$$

$$(-0.05k^2+0.16k)d<\bar{x}_O<(-0.15k^2+0.49k)d, \text{ when } l \text{ is } 4 \quad (3)$$

$$(-0.02k^2+0.12k)d<\bar{x}_O<(-0.06k^2+0.35k)d, \text{ when } l \text{ is } 5 \quad (4),$$

wherein k is a ratio of twisting pitch $P_1$ of the filament of the inner layer to twisting pitch $P_2$ of the filament of the outer layer and d is a filament diameter (mm), and each of the m filaments in the outer layer has a form ratio of 90% to 110%.

In a preferred embodiment of the invention, when l is 2 or 3, the entering effect is high.

The invention will now be described with reference to the accompanying drawings, wherein:

FIG. 3 is a sectional view of an embodiment of the steel cord with a two layer construction having the same twisting direction according to the invention; and FIG. 4 is a diagrammatical sectional view illustrating a twisting trajectory of a filament of an outer layer in the steel cord of FIG. 3.

Figure 1:
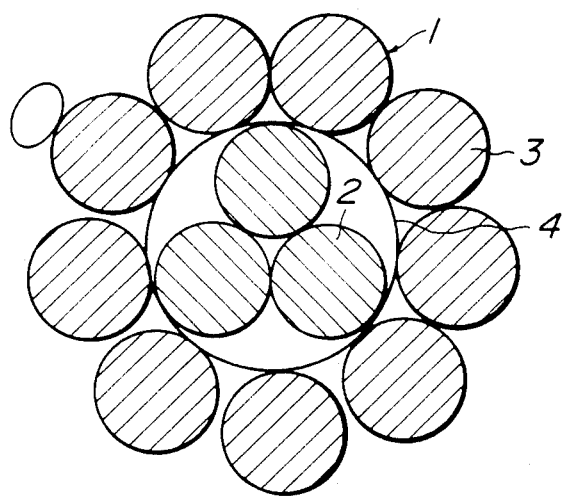
FIG. 1 is a sectional view of the conventional steel cord with a two layer construction having the same twisting direction.
Figure 2:
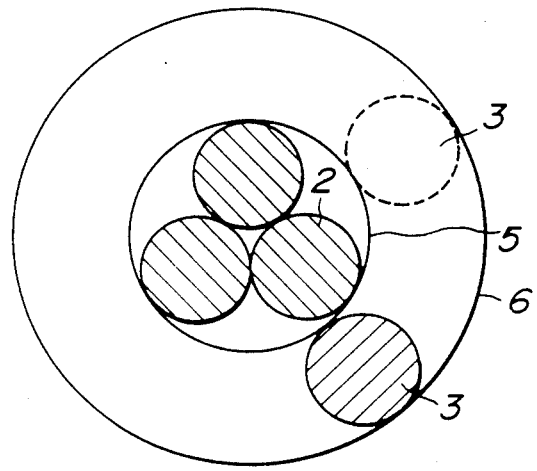
FIG. 2 is a diagrammatical sectional view illustrating a twisting trajectory of a filament of an outer layer in the steel cord of FIG. 1.

In FIG. 1 is sectionally shown the conventional steel cord 1 with a two layer construction, wherein the number of filaments 2 in the inner layer is $l=3$, and the number of filaments 3 in the outer layer is $m=9$. Although both the inner and outer layers are shown by different oblique lines to distinguish the layers from each other, the filaments in these two layers have the same twisting direction and the filaments 3 of the outer layer are not entered into an inside of a circumscribed circle 4 enveloping the filaments 2 of the inner layer. FIG. 2 illustrates a twisting trajectory of one filament 3 in the outer layer of the steel cord 1 of FIG. 1. The twisting trajectory is represented by a portion between two concentric circles 5 and 6, in which small circles represented by solid line and dotted line are both end positions of the same filament 3.

FIG. 3 illustrates an embodiment of the steel cord according to the invention having the same two layer construction as in the conventional steel cord composed of an inner layer of $l=3$ and an outer layer of $m=9$, except that the filaments 3 of the outer layer are arranged to enter into an inside of a circumscribed circle 4 enveloping the filaments 2 of the inner layer at such a portion that the filaments 3 do not come into contact with the filaments 2. The entering amount of the filament 3 of the outer layer is represented by a distance x between two tangent lines of two circles at two intersections $C_1$ and $C_2$ when a straight line g connecting a center of a sectional circle of the filament 3 to a center of the circumscribed circle 4 intersects with these two circles, and an average value of a maximum of the distance x per m filaments is represented by $\bar{x}$.

Now, the entering amount x of the filament 3 and hence its average value $\bar{x}$ are critical, which is determined by the cord construction, filament diameter and twisting pitch and measured by observing the section of the steel cord obtained by twisting filaments under a large tensile force. As a result, it has been found that in the two layer construction represented by l+m or three layer construction represented by l+m+n, a critical value for the average value $\bar{x}$ of the entering amount or a limit entering amount $\bar{x}_L$ (mm) is represented by the following four equations:

$$\bar{x}_L = (-0.73k^2 + 1.37k)d, \text{ when l is 2} \quad (5)$$

$$\bar{x}_L = (-0.31k^2 + 0.73k)d, \text{ when l is 3} \quad (6)$$

$$\bar{x}_L = (-0.15k^2 + 0.49k)d, \text{ when l is 4} \quad (7)$$

$$\bar{x}_L = (-0.06k^2 + 0.35k)d, \text{ when l is 5} \quad (8),$$

wherein d and k are the same as described in the equations (1)–(4).

In the conventional steel cord, entering of the filament as described herein, does not occur as shown in FIG. 1 or the entering amount x as shown in FIG. 3 and its average value $\bar{x}$ are very small. In this connection, the inventors have made various studies with respect to the durability of steel cords and found that when an average value $\bar{x}_O$ of the entering amount in the steel cord of a tire product (hereinafter referred to as a product entering amount) is made above a certain value over the conventional known value, the durability of steel cord is considerably improved and also a form ratio of the filament in the outer layer during wire preforming has a large influence upon the durability of steel cord.

The product entering amount $\bar{x}_O$ in the steel cord taken out from the tire is measured by microscopic observation of cord section, wherein the cord is embedded in a spontaneous setting resin after the coating rubber is removed from the outer surface of the cord in order to prevent the movement of the filaments during the polishing of its cut surface. Further, the form ratio of the filament in the outer layer is a value calculated according to the following equation:

$$\text{Form ratio (\%)} = \frac{Dw}{Dr} \times 100, \quad (9)$$

wherein Dw is an undulation size of the filament in the outer layer when disentangling the steel cord and Dr is a diameter of the steel cord.

The durability of steel cords including the conventional steel cord was examined by a breaking ratio of filament after a tire was practically run over a distance of 200,000 Km by varying the product entering amount $\bar{x}_O$, limit entering amount $\bar{x}_L$ and form ratio of the steel cord used in the tire. As a result, it has been found that the considerable reduction of the breaking ratio occurs when a ratio ($\bar{x}_O/\bar{x}_L$) of the product entering amount $\bar{x}_O$ to the limit entering amount $\bar{x}_L$ is not less than $\frac{1}{3}$ and also the breaking ratio is small when the form ratio is within a range of 90–110%. When the ratio $\bar{x}_O/\bar{x}_L$ is less than $\frac{1}{3}$ and the form ratio is outside the range of 90–110%, the breaking of the filaments in the inner layer is caused precedently. In the conventional steel cord, the ratio $\bar{x}_O/\bar{x}_L$ is 0~$\frac{1}{4}$, so that the breaking ratio is about 3%.

In order to improve the durability of the filaments in the steel cord, therefore, it is necessary to make the product entering amount $\bar{x}_O$ larger than $\frac{1}{3}$ of the limit entering amount $\bar{x}_L$ but smaller than the limit entering amount $\bar{x}_L$. On the other hand, the limit entering amount $\bar{x}_L$ is varied in accordance with the number of filaments in the inner layer, so that the product entering amount $\bar{x}_O$ is necessary to be within ranges represented by the equations (1)–(4).

When the form ratio is less than 90%, the outer layer tightens the inner layer to increase a contact pressure of filaments between both the layers and the fretting becomes large. While, when the form ratio exceeds 110%, it is possible to enter the filaments of the outer layer into spaces between the filaments of the inner layer, but such an entering is fairly difficult and the strain becomes large and also it is difficult to control the quality of the resulting steel cord.

The effect by deeply entering the filaments of the outer layer into the inside of the circumscribed circle of the inner layer is considered as follows.

When the filaments in the inner and outer layers of the steel cord have the opposite twisting directions of S/Z or Z/S, a distance between two points when a particular helical filament of the outer layer contacts with the filaments of the inner layer is short, so that a portion of the particular helical filament extending between the two contact points forms an arc, which is difficult to deform into a chord during the tension deformation and to cause the concentration of tension into the inner layer. Consequently, the reduction of durability due to the fretting is not prevented. On the contrary, when the filaments in the inner and outer layers have the same twisting direction of S/S or Z/Z, the fretting is prevented, but the distance between the two contact points becomes fairly longer as compared with the case of opposite twisting relation, so that the deformation of the arc into the chord occurs between the two contact points prior to the deformation of the filament of the outer layer itself during the tension deformation of the steel cord. Thus, the filaments of the outer layer enter into twisting spaces of the inner layer. As the deformation into the chord becomes conspicuous, the tension is born by the filaments of the inner layer rather than by the filaments of the outer layer, so that the breaking of the filament in the inner layer is preferentially caused. Therefore, it is understood that such an unbalance of tension bearing can be prevented by first entering the filaments of the outer layer into the space of the inner layer above a certain value.

When the forming of the filament is insufficient or becomes excessive, if such filaments are used to form a steel cord, they tend to move to mitigate the elastic deformation, so that there are caused forces acting to the inner and outer layers. Such a force becomes larger as the form ratio exceeds 100%, so that it is necessary to hold the form ratio at approximately 100%. Moreover, the force acting to the inner and outer layers (i.e. initial contact force) is added to a tensile contact force produced by tightening each of both the layers under the tension of the steel cord, which serves as a friction force in the fretting between mutual filaments, so that it is preferably made as small as possible.

In order to enter the filaments of the outer layer into the inside of the circumscribed circle enclosing the filaments of the inner layer within the range $\bar{x}_O$ defined in the invention, it is sufficient that the tension of the filament in the outer layer is made higher than that of the prior art, for example, during the formation of the cord. In this case, however, care should be taken so that the tension of each filament in the outer layer is made uniform.

invention. As apparent from Table 1, the filament breaking ratio is considerably improved in the examples according to the invention as compared with the comparative examples.

TABLE 1

| | Steel cord applied to carcass ply | | | | | | | | | |
|---|---|---|---|---|---|---|---|---|---|---|
| | Count number (cords/ 5 cm) | Cord construction*1 | Twisting direction | Twisting pitch*2 | $k = P_1/P_2$ | Product entering amount $\bar{x}_O$ (μm) | Limit entering amount $\bar{x}_L$ (μm) | $\bar{x}_O/\bar{x}_L$ | Form ratio (%) | Filament breaking ratio (%) |
| Example 1 | 15.1 | 3 + 9 × 0.23 + 1 | S/S/Z | 6/12/3.5 | 0.50 | 24 | 66 | 0.36 | 100 | 0.9 |
| Example 2 | " | " | " | " | " | 36 | " | 0.55 | 90 | 0.2 |
| Comparative Example 1 | " | " | " | " | " | 16 | " | 0.24 | 80 | 3.0 |
| Comparative Example 2 | " | " | " | " | " | 32 | " | 0.48 | 70 | 1.4 |
| Comparative Example 3 | " | " | " | " | " | 12 | " | 0.18 | 120 | 5.3 |
| Example 3 | " | " | " | 6/10/3.5 | 0.60 | 30 | 75 | 0.40 | 100 | 0.3 |
| Comparative Example 4 | " | " | " | " | " | 14 | " | 0.19 | 100 | 3.4 |
| Example 4 | " | " | " | 5/12/3.5 | 0.42 | 39 | 57 | 0.68 | 90 | 0.2 |
| Comparative Example 5 | " | " | " | " | " | 14 | " | 0.25 | 90 | 2.6 |
| Example 5 | 14.1 | 4 + 10 × 0.22 + 1 | Z/Z/S | 6/12/3.5 | 0.50 | 34 | 45 | 0.75 | 100 | 0.5 |
| Comparative Example 6 | " | " | " | " | " | 10 | " | 0.22 | 90 | 2.0 |
| Comparative Example 7 | " | " | " | " | " | 5 | " | 0.11 | 120 | 4.8 |
| Comparative Example 8 | " | " | " | " | " | 24 | " | 0.53 | 120 | 1.4 |
| Comparative Example 9 | " | " | " | " | " | 28 | " | 0.62 | 70 | 1.1 |
| Example 6 | 11.6 | 3 + 9 + 15 × 0.175 + 1 | S/S/Z/S | 5.5/10.5/15.5/3.5 | 0.52 | 38 | 52 | 0.73 | 90 | 0.3 |
| Comparative Example 10 | " | 3 + 9 + 15 × 0.175 + 1 | " | " | " | 14 | " | 0.27 | 80 | 3.6 |

*1 The last "+1" of the cord construction shows a wrapping filament for improving the compression properties.
*2 The last "3.5" of the twisting pitch shows a twisting pitch of the wrapping filament.

The twisting trajectory of one filament in the outer layer of the steel cord of FIG. 3 is represented by a portion between lines 5 and 6 shown in FIG. 4, wherein the filament of the outer layer enters into the space between the filaments of the inner layer to produce a crushed annular form.

The following examples are given in illustration of the invention and are not intended as limitations thereof.

EXAMPLES 1–6, COMPARATIVE EXAMPLES 1–10

Tires to be tested were manufactured by applying to carcass ply steel cords having various product entering amounts $\bar{x}_O$ and form ratios as shown in the following Table 1 and then subjected to a practical running test to evaluate the durability of the steel cord.

The tire had a size of 1000 R20 14PR and was run on expressways and public roads over a distance of 200,000 Km. Thereafter, the steel cord was taken out from the tire to examine the filament breaking ratio. After the examination of 40 steel cords, the filament breaking ratio was determined by the following equation:

Filament breaking ratio (%) = 
$$\frac{\text{Number of broken filaments}}{\text{Total filament number}} \times 100$$

The thus obtained results are shown in Table 1. Among the comparative examples, Comparative Example 1 is the case of using the conventional steel cord. Steel cords having $\bar{x}_O/\bar{x}_L$ of 0.33~1 and form ratio of 90~110% correspond to examples according to the invention. As apparent from Table 1, the filament breaking ratio is considerably improved in the examples according to the invention as compared with the comparative examples.

EXAMPLES 7–8, COMPARATIVE EXAMPLES 11–13

In general, when the tire is run on rough road, if a tread of the tire is subjected to penetration damage, water may penetrate into this damage to cause breaking of steel cord in the outermost belt layer and belt layer therebeneath due to corrosion fatigue and finally cause tire burst. Therefore, the cords to be used in the belt are required to have a high corrosion fatigue resistance or high fatigue properties.

In order to confirm the effect of the invention for use in the belt, tires to be tested were manufactured by applying steel cords having various product entering amounts and form ratios as shown in the following Table 2 to a third belt layer in a belt of 4 belt layer structure and then practically run on rough road to evaluate the cord breaking property of the belt. This evaluation was performed by running the tire on rough road over a distance of 30,000 Km, retreading it and again running on rough road over a distance of 30,000 Km.

| Tire size | 1000 R 20 |
|---|---|
| Belt structure | 4 belt layer |
| Application of steel cord to be tested | Third belt layer |
| Count number | 18.6 cords/5 cm |
| Cord angle in belt | 72° left |
| Construction of steel cord | 3 + 9 + 15 × 0.23 + 1 |
| Twisting direction | S/S/Z/S |
| Twisting pitch | 6/12/18/3.5 |

-continued

| | |
|---|---|
| k = P₁/P₂ | 0.5 |

In the above steel cord, nine filaments were entered into spaces defined by three filaments.

The cord breaking property was evaluated by dividing the tire after the running into six equal parts, counting the number of broken cords in the third belt layer and calculating an index according to the following equation:

$$\text{Index} = \frac{\text{Broken number of cords to be tested}}{\text{Broken number of conventional cords}} \times 100$$
(Comparative Example 11)

The smaller the index value, the better the cord breaking property.

The thus obtained results are shown in Table 2. Comparative Example 11 is the case of using conventional steel cord. As apparent from Table 2, the steel cords of Examples 7 and 8 are excellent in cord breaking property as compared with those of the comparative examples.

TABLE 2

| | Steel cord applied to belt | | | | |
|---|---|---|---|---|---|
| | Product entering amount $x_O$ (μm) | Limit entering amount $x_L$ (μm) | $\bar{x}_O/\bar{x}_L$ | Form ratio (%) | Cord breaking property (index) |
| Example 7 | 30 | 66 | 0.45 | 100 | 60 |
| Example 8 | 42 | " | 0.64 | 90 | 45 |
| Comparative Example 11 | 18 | " | 0.27 | 80 | 100 |
| Comparative Example 12 | 28 | " | 0.42 | 60 | 110 |
| Comparative Example 13 | 14 | " | 0.21 | 120 | 130 |

According to the invention, in a pneumatic radial tire comprising as a tire reinforcement steel cords having a two or three layer construction wherein two layers at a center side of a transverse section in the steel cord have the same twisting direction but different twisting pitches, filaments constituting an outer layer among the above two layers are entered into an inside of a circumscribed circle enveloping filaments constituting an inner layer above a predetermined value and each filaments of the outer layer has a form ratio of 90–110%, whereby tension unbalance in the same twisting direction is eliminated without damaging the prevention of fretting phenomenon in the same twisting direction to considerably improve the durability of the steel cord. Further, according to the invention, such steel cords are applied to the carcass or belt of the pneumatic radial tire, whereby the tire life is considerably improved.

What is claimed is:

1. A pneumatic radial tire comprising; a tire reinforcement having steel cords each having a two or three layer construction represented by a designation of l+m or l+m+n, wherein l, m and n are an integer, respectively and satisfy a relation of l<m<n and l is an integer of 2 to 5, in which two layers at a center side of a transverse section in said steel cord represented by the designation of l+m have the same twisting direction but different twisting pitches, wherein m filaments constituting an outer layer among said two layers are arranged to enter into an inside of a circumscribed circle enveloping l filaments constituting an inner layer among said two layers at such a portion that the filaments of said outer layer do not come into contact with the filaments of said inner layer, and an average value $\bar{x}_o$ of a maximum value of an amount of entering a filament into the inside of the circumscribed circle per m filaments in the steel cord of a tire product satisfies the following equations:

$$(-0.24k^2+0.46k)d < \bar{x}_O < (-0.73k^2+1.37k)d, \text{ when } l \text{ is } 2 \quad (1)$$

$$(-0.10k^2+0.24k)d < \bar{x}_O < (-0.31k^2+0.73k)d, \text{ when } l \text{ is } 3 \quad (2)$$

$$(-0.05k^2+0.16k)d < \bar{x}_O < (-0.15k^2+0.49k)d, \text{ when } l \text{ is } 4 \quad (3)$$

$$(-0.02k^2+0.12k)d < \bar{x}_O < (-0.06k^2+0.35k)d, \text{ when } l \text{ is } 5 \quad (4),$$

wherein k is a ratio of twisting pitch $P_1$ of the filament of the inner layer to twisting pitch $P_2$ of the filament of the outer layer and d is a filament diameter, each of the m filaments in the outer layer has a form ratio of 90% to 110%, a limit entering amount $\bar{x}_L$ forms a ratio $\bar{x}_O/\bar{x}_L$ within a range of 0.33–1.0 wherein said limit entering amount $\bar{x}_L$ is represented by the following four equations:

$$\bar{x}_L = (-0.73k^2+1.37k)d, \text{ when } l \text{ is } 2 \quad (5)$$

$$\bar{x}_L = (-0.31k^2+0.73k)d, \text{ when } l \text{ is } 3 \quad (6)$$

$$\bar{x}_L = (-0.15k^2+0.49k)d, \text{ when } l \text{ is } 4 \quad (7)$$

$$\bar{x}_L = (-0.06k^2+0.35k)d, \text{ when } l \text{ is } 5 \quad (8)$$

wherein k and d are as defined above and wherein all l and m filaments have the same filament diameter d.

2. A pneumatic radial tire according to claim 1, wherein l is 2 or 3.

3. In a pneumatic radial tire comprising as a tire reinforcement steel cords each having a two layer construction represented by a designation of 3+9, in which the two layers at a center side of a transverse section in said steel cord represented by the designation of 3+9 have the same twisting direction but different twisting pitches, the improvement wherein all filaments constituting the cord have the same filament diameter, and 9 filaments constituting an outer layer among said two layers are arranged so as to enter into an inside of a circumscribed circle enveloping 3 filaments constituting an inner layer among said two layers at such a portion that the filaments of said outer layer do not come into contact with the filaments of said inner layer, and an average value $\bar{x}_o$ of a maximum value of an amount of entering a filament into the inside of the circumscribed circle per 9 filaments in the steel cord of a tire product satisfies the following equation:

$$(-0.10k^2+0.24k)d < \bar{x}_o < (-0.31k^2+0.73k)d,$$

wherein k is a ratio of twisting pitch $P_1$ of the filament of the inner layer to twisting pitch $P_2$ of the filament of the outer layer and d is a filament diameter, and a ratio of the product entering amount $\bar{x}_o$ to a limit entering amount $\bar{x}_L$ is within a range of 0.33–1.0, wherein said limiting entering amount $\bar{x}_L$ satisfies the following equation:

$$\bar{x}_L = (-0.31k^2+0.73k)d$$

wherein k and d are as defined above and each of the 9 filaments in the outer layer has a form ratio of 90% to 110%.

* * * * *